N. C. BEMENT.
LUG FOR TREAD SURFACES.
APPLICATION FILED NOV. 15, 1920.
1,414,334.
Patented May 2, 1922.
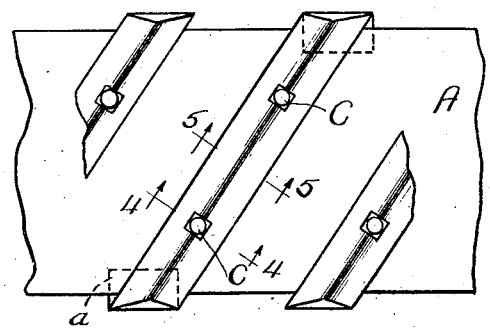
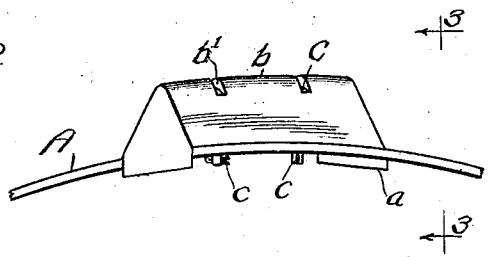
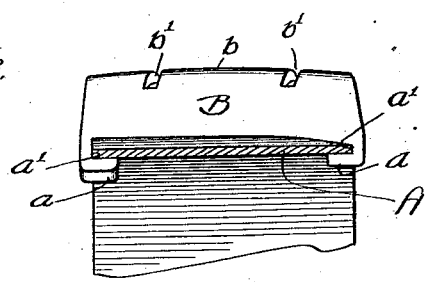
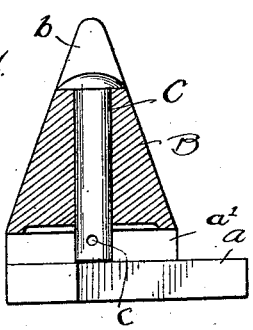
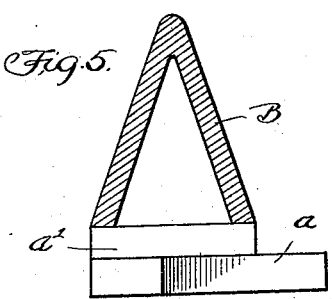

UNITED STATES PATENT OFFICE.

NAHUM C. BEMENT, OF ROCKFORD, ILLINOIS.

LUG FOR TREAD SURFACES.

1,414,334.  Specification of Letters Patent.  Patented May 2, 1922.

Application filed November 15, 1920. Serial No. 424,045.

*To all whom it may concern:*

Be it known that I, NAHUM C. BEMENT, a citizen of the United States, residing at Rockford, Winnebago County, Illinois, have invented certain new and useful Improvements in Lugs for Tread Surfaces, of which the following, taken in connection with the drawings, is a description.

My invention has for its object the production of an improved tread surface for motor vehicle wheels used particularly on power driven mechanisms such as farm tractors.

The principal object of my invention is to provide a lug for tread surfaces which may be quickly and easily removed from the tread surface and replaced when needed for road service or for field work.

A further object of my invention is to provide a lug of this class which will be self cleaning, the form of its construction being such that under pressure of revolution of the wheel the lug has a rolling action in the earth making its depression wider than the tread surface of the lug, thereby permitting it to be withdrawn without the earth clinging to it.

One of the purposes of my invention is to provide detachable means forming an irregular surface on the tread of the tire so that the wheels of the vehicle may be utilized for different kinds of service when necessary for road travel or for field work. Among users of farm tractors it is well known that a smooth tread surface will not grip the earth in propelling the vehicle as readily as a wheel with a roughened or irregular surface.

It is also well known that when it becomes necessary to propel the tractor on a highway it is necessary to have a smooth tread surface in many of the States to comply with the law, and it is desirable and advantageous to have a wheel also adapted for plowing, disking, etc., in connection with regular farm work.

My invention therefore is devised to overcome any objections in either case and enable the user to have what might be determined an interchangeable tread surface with changing wheels.

A further object of my invention is to provide lugs for attachment to the tread surfaces of the vehicle wheels which are so constructed that they may be readily attached and removed as desired, which shall be simple in construction, easily and quickly removed and very effective for the purpose intended.

In the accompanying drawings I have illustrated what I now consider the preferred form of an embodiment of my detachable lugs and in these drawings:

Fig. 1 is a plan view of a fragment of the tread surfaces of a wheel illustrating the device attached thereto in position to be used, Fig. 2 is a transverse view of a lug illustrating the lug attached to the rim of the tire, Fig. 3 illustrates a side view of the lug and a sectional view of a portion of the wheel rim, Fig. 4 is a sectional view taken on line 4—4 of Figure 1, and:

Fig. 5 is a sectional view taken on line 5—5 of Figure 1.

Referring to the drawings A represents the tread surface of an ordinary vehicle rim of the class referred to and which may be of any size suitable for the purpose.

B is the lug which is removably attached to the tread surfaces of the rim and which is preferably triangular in cross section as more clearly shown in Figures 4 and 5. The ends of the lug are provided with inwardly bent flanges $a$, $a$, forming recesses, $a'$, $a'$, which receive the edges of the rim A when the lug is placed in position as shown in Figure 1.

The outer or tread surface $b$ of this lug B is provided with countersunk recesses and openings $b'$, $b'$, through each of which is passed a bolt C, which extends through the body of the lug and through corresponding openings in the tread surface of the rim A. Each of these bolts is provided with a transverse opening through the shank thereof which receives the cotter pin on the inside of the rim and locks the parts together clearly shown in Figures 2 and 4. The portions of the lugs through which the bolts C pass have a reinforced area as shown more clearly in Figure 4, the body of the lug otherwise being hollow as shown in section in Figure 5.

In arranging the lugs B upon the rim A of the wheel they are positioned diagonally across the tread surface thereof as illustrated in Figure 1. Each lug is secured by the two bolts C, C, which are arranged in staggered relation to each other as shown.

It will be observed that the holding flanges *a* extend in a direction transversely of the tread surfaces, while the face of the lug extends diagonally of the tread surfaces of the rim. By this engagement the strain upon the lugs under pressure of the revolution of the wheel is taken by the lugs themselves and the flanges engaging over the edges of the rim, the bolts serving only to retain the lugs in proper alignment.

When it is to be used in the field the lugs are placed upon the wheel rim in the manner described, and when the machine is to be used on a highway, the cotter pins are removed from the bolts and the lugs lifted off the rim. The operation of putting on and removing the lugs is very simple and only requires the removal of the cotter pins, turn the lugs straight across the rim of the tire when they may be readily removed.

I claim:

1. A lug for wheel rims comprising a hollow body member which is angular in cross section, a reinforced portion near each end of said lug, fastening members extending through each reinforced portion and through the wheel rim, and flanges on the ends of the lug having engagement with the wheel rim.

2. A lug for wheel rims comprising a hollow body member positioned diagonally across the tread surface of the wheel rim, reinforced portions formed integrally with the lug body, attaching members extending through openings in each of said reinforced portions and through the wheel rim and flanges formed integrally with the ends of the lugs.

3. A lug for wheel rims comprising a hollow body member extending across the tread surface thereof, the body of said lug being angular in cross section and having reinforced portions near each end thereof, flanges on the ends of said lugs for engaging around the edges of the periphery of the wheel rim, the tread surface of said lug having countersunk openings, and means extending through said openings and through the wheel rim for detachably securing each lug thereof independently of the other lugs.

4. Lugs forming tread surfaces of wheel rims, each comprising an angular hollow body member attached directly to the wheel rim, reinforced portions near each end of the lug, a flange at each end of the lug extending at an angle to the longitudinal center thereof, the flanges extending parallel with the edge of said wheel rim, and means extending through the reinforced portions of each lug and the wheel rim for detachably and independently securing each lug to the wheel rim.

In testimony whereof I have signed this specification.

NAHUM C. BEMENT.